US011001672B2

(12) United States Patent
Pinnau et al.

(10) Patent No.: US 11,001,672 B2
(45) Date of Patent: May 11, 2021

(54) POLYIMIDE, DIANHYDRIDE MONOMERS, AND POLYMERS, METHODS OF MAKING AND USES THEREOF

(71) Applicant: King Abdullah University of Science and Technology, Thuwal (SA)

(72) Inventors: Ingo Pinnau, Thuwal (SA); Bader Saleh Ghanem, Thuwal (SA); Mahmoud Atef Abdulhamid, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 196 days.

(21) Appl. No.: 16/099,871

(22) PCT Filed: May 1, 2017

(86) PCT No.: PCT/IB2017/052520
§ 371 (c)(1),
(2) Date: Nov. 8, 2018

(87) PCT Pub. No.: WO2017/195068
PCT Pub. Date: Nov. 16, 2017

(65) Prior Publication Data
US 2019/0085132 A1 Mar. 21, 2019

Related U.S. Application Data

(60) Provisional application No. 62/334,544, filed on May 11, 2016.

(51) Int. Cl.
| | |
|---|---|
| *C08G 73/06* | (2006.01) |
| *C08G 73/10* | (2006.01) |
| *B01D 53/22* | (2006.01) |
| *B01D 71/64* | (2006.01) |

(52) U.S. Cl.
CPC ....... *C08G 73/1078* (2013.01); *B01D 53/225* (2013.01); *B01D 71/64* (2013.01); *C08G 73/06* (2013.01); *C08G 73/1007* (2013.01); *C08G 73/1021* (2013.01); *C08G 73/1032* (2013.01); *C08G 73/1085* (2013.01)

(58) Field of Classification Search
CPC .............. C08G 73/1078; C08G 73/06; C08G 73/1007; C08G 73/1021; C08G 73/1032; C08G 73/1085; B01D 53/225; B01D 71/64
See application file for complete search history.

(56) References Cited

U.S. PATENT DOCUMENTS

| | | | | |
|---|---|---|---|---|
| 2004/0266979 | A1* | 12/2004 | Oguro | C08G 73/1028 528/336 |
| 2014/0030593 | A1* | 1/2014 | Kim | H01M 4/137 429/213 |
| 2014/0352534 | A1* | 12/2014 | Sano | C08G 73/1039 95/51 |
| 2015/0207123 | A1* | 7/2015 | Jeon | C08G 73/1067 429/144 |

FOREIGN PATENT DOCUMENTS

WO    2015001422    1/2015

OTHER PUBLICATIONS

Wang et al. ("Troger's Base-based Microporous Polyimide Membranes for High-performance Gas Separation", ACS Macro Lett., 2014, p. 597-601).*
Neyertz ("Molecular Dynamics Simulations of Helium Permeation in Polyimides with a Bulky Dianhydride and a Fluorinated Diamine", Macromolecular: Theory and Simulations, 2007, p. 513-524).*
Park et al. ("High Performance Polyimide with High Internal Free Volume Elements" Macromol. Rapid Commun. 2011, 32, 579-586) (Year: 2011).*
Harruna et al. ("Synthesis and Characterization of High Temperature Polyimides from Bicyclic Dianhydrides" Journal of Macromolecular Science 2003, A40, 9, 915-932) (Year: 2003).*
McKeown et al. ("Triptycene-based Polymers of Intrinsic Microporosity: Organic Materials That Can Be Tailored for Gas Adsorption" Macromolecules 2010, 43, 5287-5294) (Year: 2010).*
Cho, et al., "High Performance Polyimide with High Internal Free Volume Elements", Macromolecular Rapid Communications, vol. 32, No. 7, May 18, 2011, 579-586.
Ghanem, et al., "Ultra-Microporous Triptycene-based Polyimide Membranes for High-Performance Gas Separation", Advanced Materials, vol. 26, No. 22, Mar. 11, 2014, 3688-3692.
Neyertz, et al., "Molecular Dynamics Simulations of Helium Permeation in Polyimides with a Bulky Dianhydride and a Fluorinated Diamine", Macromolecular: Theory and Simulations, vol. 16, No. 5, Jul. 9, 2007, 513-524.
Wang, et al., "Troger's Base-Based Microporous Polyimide Membranes for High-Performance Gas Separation", ACS Macro Letters, vol. 3, No. 7, Jun. 10, 2014, 597-601.
Search Report and Written Opinion for PCT/IB2017/052520 dated Jul. 19, 2017.
Pascoe, et al., "Synthesis and Characterization of High Temperature Polyimides from Bicyclic Dianhydrides", Journal of Macromolecular Science, Part A, 2003, 915-932.
Wolinsky, et al., "A Novel Route to Bicyclo [2.2.2] octenetetracarboxylic Acid Dianhydrides", J. Org. Chem., vol. 37, 1972, 121-125.

* cited by examiner

*Primary Examiner* — Travis M Figg
(74) *Attorney, Agent, or Firm* — Billion & Armitage

(57) ABSTRACT

Embodiments of the present disclosure include, a dianhydride monomer, a polyimide, a method of making a dianhydride, a method of making a polyimide, and the like. Embodiments of the present disclosure can be used in membrane-based gas separation applications.

10 Claims, No Drawings

POLYIMIDE, DIANHYDRIDE MONOMERS, AND POLYMERS, METHODS OF MAKING AND USES THEREOF

CROSS-REFERENCE TO RELATED APPLICATIONS

This application claims the benefit of and priority to U.S. Provisional Application Ser. No. 62/334,544, having the title "POLYIMIDE, DIANHYDRIDE MONOMER MONOMERS, AND POLYMERS, METHODS OF MAKING AND USES THEREOF" filed on May 11, 2016, the disclosure of which is incorporated herein in by reference in its entirety.

BACKGROUND

Gas separation is an emerging technology with a rapidly developing market containing applications like air separation for oxygen and nitrogen enrichment as well as acid gas removal and hydrocarbon recovery from natural gas streams. As such there exists an urgent need for improved compositions and methods of synthesizing compounds that can be used in gas separation and other applications.

SUMMARY

Embodiments of the present disclosure include, a dianhydride monomer, a polyimide, a method of making a dianhydride, a method of making a polyimide, and the like. Embodiments of the present disclosure can be used in membrane-based gas separation applications.

In an aspect, the present disclosure provides for a microporous polyimide, among others, that includes the following structure:

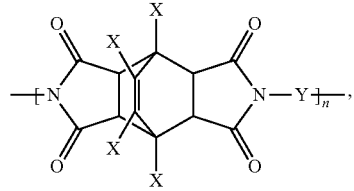

wherein n is an integer, wherein each X is independently selected from the group consisting of H, a halogen, an alkyl group, an aryl group, and a heteroaryl group, wherein Y is a bivalent organic group selected from the group consisting of:

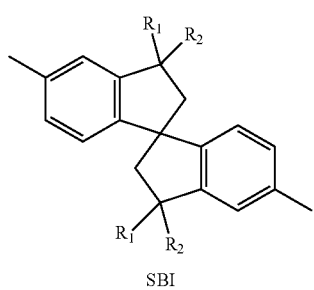

SBI

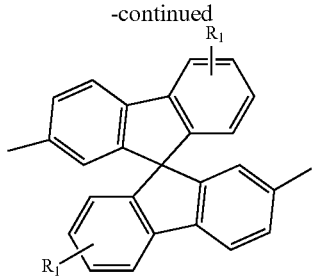

SBF

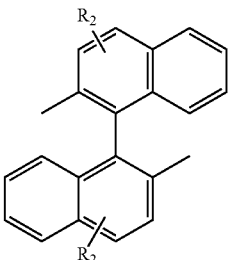

BIN

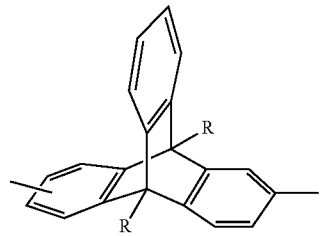

TP

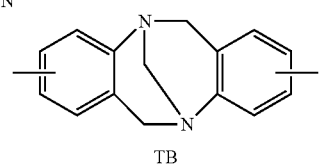

TB wherein each R, $R_1$, and $R_2$ are independently selected from the group consisting of: H, a halogen, and an alkyl group, wherein when the bond is directed to the middle of a ring, this indicates that, optionally, 1 to 4 $R_1$ or $R_2$ group is attached to the ring and each $R_1$ or $R_2$ group is independently selected. In an aspect, the microporous polyimide can be used in a membrane for performing gas separations, wherein for membrane-based gas separations include separations of gases selected from the group consisting of: $O_2/N_2$ gas separations; $H_2/N_2$ gas separations; $H_2/C_{1+}$ hydrocarbons gas separations; $He/C_{1+}$ hydrocarbons gas separations; $CO_2/C_{1+}$ hydrocarbons gas separations; $CO_2/N_2$ gas separations; and olefins/paraffins gas separations.

In an aspect, the present disclosure includes a method of making a polyimide, among others, that includes:

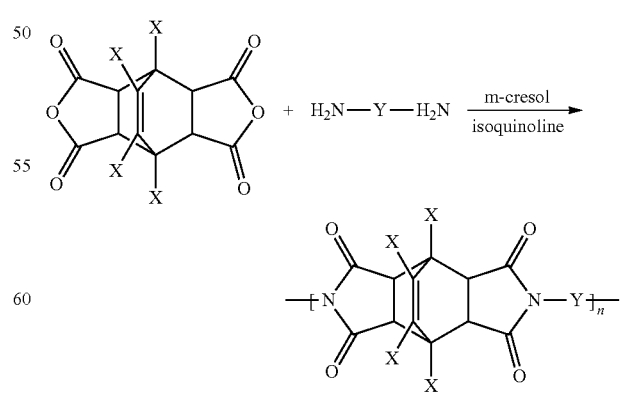

wherein n is an integer, wherein each X is independently selected from the group consisting of H, a halogen, an alkyl group, an aryl group, and a heteroaryl group, wherein Y is a divalent organic group selected from the group consisting of:

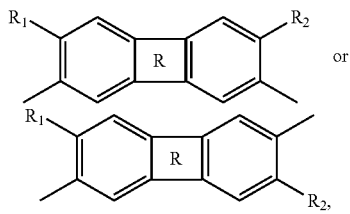

wherein R is selected from the following structures:

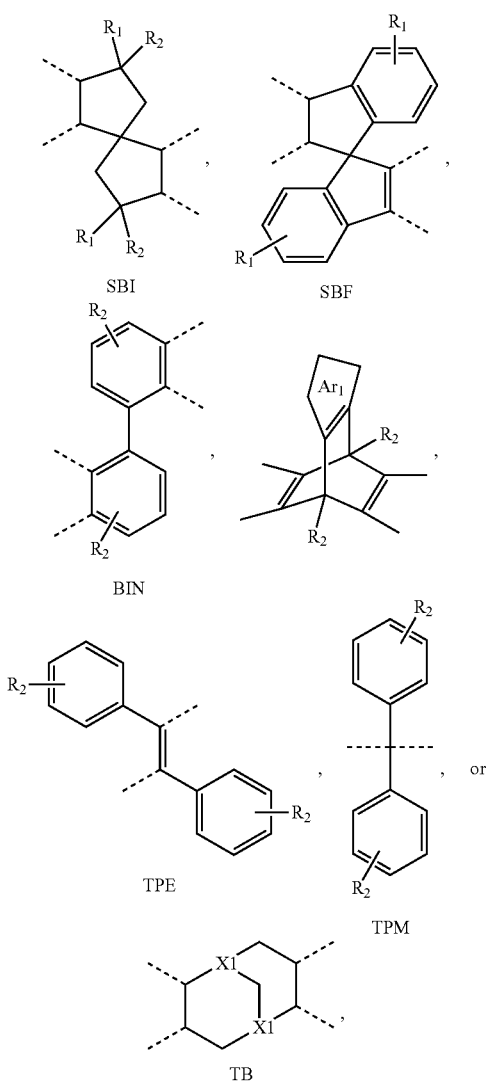

where X1 is N or H, wherein each $R_1$ and $R_2$ are independently selected from the group consisting of: H, a halogen, and an alkyl group, wherein when the bond is directed to the middle of a ring, this indicated that, optionally, 1 to 4 $R_1$ or $R_2$ groups is attached to the ring and each $R_1$ or $R_2$ group is independently selected, wherein $Ar_1$ is selected from the group consisting of: an aryl group and a heteroaryl group, where each are substituted or unsubstituted.

Other compositions, methods, features, and advantages will be or become apparent to one with skill in the art upon examination of the following drawings and detailed description. It is intended that all such additional compositions, methods, features and advantages be included within this description, be within the scope of the present disclosure, and be protected by the accompanying claims.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, organic chemistry, biochemistry, and the like, which are within the skill of the art. Such techniques are explained fully in the literature.

Definitions

By "chemically feasible" is meant a bonding arrangement or a compound where the generally understood rules of organic structure are not violated. The structures disclosed herein, in all of their embodiments are intended to include only "chemically feasible" structures, and any recited structures that are not chemically feasible, for example in a structure shown with variable atoms or groups, are not intended to be disclosed or claimed herein. However, if a bond appears to be intended and needs the removal of a group such as a hydrogen from a carbon, the one of skill would understand that a hydrogen could be removed to form the desired bond.

The term "substituted" refers to any one or more hydrogen atoms on the designated atom (e.g., a carbon atom) that can be replaced with a selection from the indicated group (e.g., halide, hydroxyl, alkyl, and the like), provided that the designated atom's normal valence is not exceeded. As used herein, the term "optionally substituted" typically refers to from zero to four substituents, wherein the substituents are each independently selected. Each of the independently selected substituents may be the same or different than other substituents. For example, the substituents (e.g., an R type group) of a formula may be optionally substituted (e.g., from 1 to 4 times) with independently selected H, halogen, hydroxy, acyl, alkyl, alkenyl, alkynyl, cycloalkyl, heterocyclo, aryl, heteroaryl, alkoxy, amino, amide, thiol, sulfone, sulfoxide, oxo, oxy, nitro, carbonyl, carboxy, amino acid sidechain, amino acid, etc. In an embodiment, substituted includes substitution with a halogen.

As used herein, "aliphatic" or "aliphatic group" refers to a saturated or unsaturated, linear or branched, cyclic (non-aromatic) or heterocyclic (non-aromatic), hydrocarbon or hydrocarbon group, where each can be substituted or unsubstituted, and encompasses alkyl, alkenyl, and alkynyl groups, and alkanes, alkene, and alkynes, for example, substituted or unsubstituted.

As used herein, "alkyl" or "alkyl group" refers to a saturated aliphatic hydrocarbon radical which can be straight or branched, having 1 to 20 carbon atoms, wherein the stated range of carbon atoms includes each intervening integer individually, as well as sub-ranges. An alkyl group can be monovalent (e.g., —CH$_3$) or bivalent (e.g., —CH$_2$—CH$_2$—) depending upon the specific structure or formula which it is used. A bivalent group is one which has two carbon-carbon sigma bonds, such as a —CH$_2$— or methylene group (i.e., bivalent alkyl group), as compared to a terminal —CH$_3$ (methyl) alkyl group which has only one carbon-carbon sigma bond. Examples of alkyl include, but are not limited to methyl, ethyl, n-propyl, iso-propyl, n-butyl, sec-butyl, t-butyl, n-pentyl, iso-pentyl, and sec-pentyl. The term "lower alkyl" means an alkyl group having less than 10 carbon atoms. Reference to an alkyl includes unsubstituted alkyls or substituted alkyls.

As used herein, "halo", "halogen", or "halogen radical" refers to a fluorine, chlorine, bromine, and iodine, and radicals thereof. Further, when used in compound words, such as "haloalkyl" or "haloalkenyl", "halo" refers to an alkyl or alkenyl radical in which one or more hydrogens are substituted by halogen radicals. Examples of haloalkyl include, but are not limited to, trifluoromethyl, trichloromethyl, pentafluoroethyl, and pentachloroethyl.

The term "aryl" as used herein, refers to an aromatic monocyclic or multicyclic ring system of about 6 to about 14 carbon atoms, preferably of about 6 to about 10 carbon atoms. Exemplary aryl groups include phenyl or naphthyl, or phenyl substituted or naphthyl substituted. Reference to an aryl includes unsubstituted aryls or substituted aryls.

The term "heteroaryl" is used herein to denote an aromatic ring or fused ring structure of carbon atoms with one or more non-carbon atoms, such as oxygen, nitrogen, and sulfur, in the ring or in one or more of the rings in fused ring structures. Preferred examples are furanyl, imidazoyl, pyranyl, pyrrolyl, and pyridyl. Reference to a heteroaryl includes unsubstituted heteroaryls or substituted heteroaryls.

The term "substituted," as in "substituted alkyl", "substituted aryl", "substituted heteroaryl" and the like means that the substituted group may contain in place of one or more hydrogens a group such as alkyl, hydroxy, amino, halo, trifluoromethyl, cyano, —NH (lower alkyl), —N(lower alkyl)$_2$, lower alkoxy, lower alkylthio, or carboxy, and thus embraces the terms haloalkyl, alkoxy, fluorobenzyl, and the sulfur and phosphorous containing substitutions referred to below.

Intrinsic microporosity is defined herein as a polymeric material with pore sizes of less than 2 nm and a surface porosity of >100 m$^2$/g, as determined by nitrogen adsorption method at 77 K.

The term "polyimide" as used herein is a group of polymers of imide monomers demonstrating heat- and chemical-resistant properties, and refers to either homopolyimide or copolyimides.

Discussion

Embodiments of the present disclosure include, a dianhydride monomer, a polyimide, a method of making a dianhydride, a method of making a polyimide, and the like. Embodiments of the present disclosure can be used in membrane-based gas separation applications.

Polyimides can be high performance materials that can be used in a range of applications due to their thermal and chemical stability, mechanical robustness, superior film-forming properties, and structural diversity. In an aspect, these materials can also be used in gas separation technologies, aerospace industry applications, electronic industry applications, and in high temperature adhesion and composite materials.

For example, embodiments of the present disclosure can be used in membrane-based gas separation applications including air separation for nitrogen production (e.g., O$_2$/N$_2$), hydrogen recovery (H$_2$/N$_2$ and H$_2$/CH$_4$) natural gas sweetening (CO$_2$/CH$_4$) and carbon capture from flue gas (CO$_2$/N$_2$).

Recently, polyimides of intrinsic microporosity (PIMPIs) demonstrated properties for membrane-based gas separation applications. The microporosity of PIM-PIs arises from sterically hindered contortion sites integrated in a rigid polymer backbone which: (i) severely restricts chain mobility, (ii) prohibits space-efficient packing and (iii) generates high free volume. In an embodiment, the molecular structure of monomers and polymers can be tailored by chemical or thermal modifications.

An embodiment of the present disclosure includes methods of making a dianhydride monomer. For example, a dianhydride monomer can be made using the following reaction scheme:

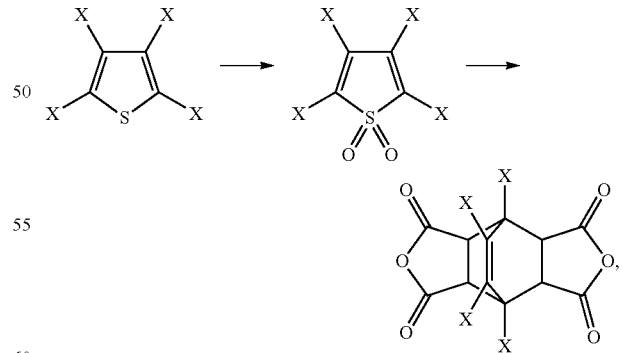

where each X is independently selected from: H, a halogen, an alkyl group, an aryl group, and heteroaryl group, substituted or unsubstituted. In general, the thiophene can be converted to thiophene dioxides using a first reactant such as m-chloroperbenzoic acid (mCPBA), at a reaction temperature of about 85 to 90° C. over a reaction time of about 4 to 5 days. The ratio of the thiophene to first reactant can be about 1:2 to 1:4. Subsequently, the thiophene dioxide is subject to a double Diels-Alder reaction with a second reactant such as maleic anhydride, at a reaction temperature of about 155 to 160° C. over a reaction time of about 4 to 5 days. The ratio of the thiophene dioxide to the second reactant can be about 1:2 to 1:2.5 [Pascoe, E. V.; I. I. Harruna, *Synthesis and Characterization of High Temperature Polyimides from Bicyclic Dianhydrides*. Journal of Macromolecular Science, Part A, 2003. 40(9): p. 915-932, which is included herein by reference].

In an embodiment of the present disclosure, a dianhydride monomer can be made using the following reaction scheme:

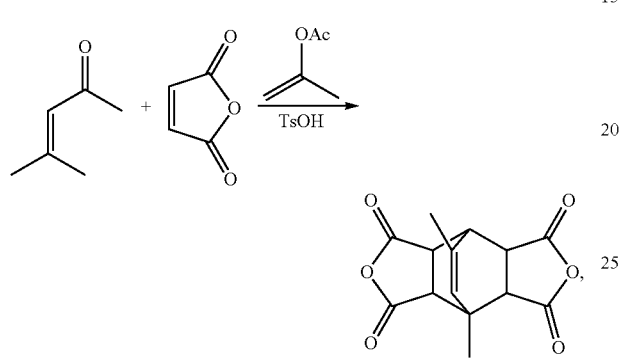

where each X is independently selected from: H, an alkyl group, an aryl group, a heteroaryl group, substituted or unsubstituted. The reactant can be subject to a double Diels-Alder reaction with a third reactant such as maleic anhydride, and a fourth reactant such as p-toluenesulfonic acid, at a reaction temperature of about 94 to 100° C. over a reaction time of about 17 to 20 hours. The ratio of the reactants to the third reactant can be about 1:2 to 1:2.5, while the ratio of the reactants to the fourth reactant can be about 1:0.02 to 1:0.05.

An embodiment of the present disclosure includes methods of making a polyimide. For example, a polyimide can be made using the following reaction scheme using dianhydride monomers of the present disclosure:

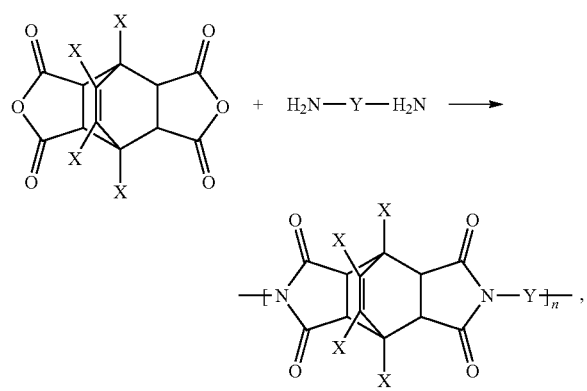

where n is an integer (e.g., 2 to 10,000 or 100,000). In an embodiment, each X is independently selected from: H, a halogen, an alkyl group, an aryl group, a heteroaryl group, substituted or unsubstituted. In an embodiment, Y can be a bivalent organic group such as:

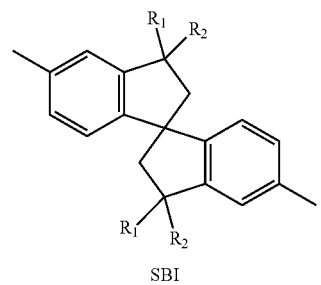

SBI

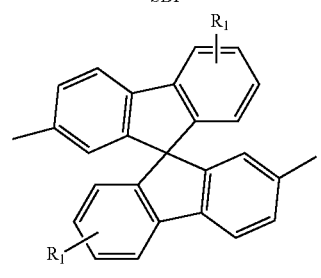

SBF

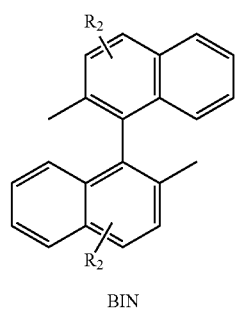

BIN

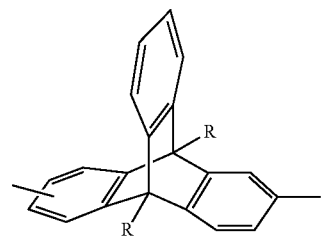

TP

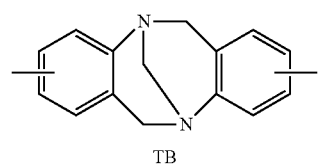

TB

In an embodiment, each R, $R_1$ and $R_2$ is independently selected from: H, a halogen, and an alkyl group, substituted or unsubstituted. When the bond is directed to the middle of a ring, this indicates that, optionally, 1 to 4 groups (R, $R_1$ and/or $R_2$) can be attached to the ring and each group is independently selected. In an embodiment, $Ar_1$ can be selected from: an aryl group and a heteroaryl group, where each are substituted or unsubstituted. In an embodiment, the method can include a high-temperature polycondensation reaction between equimolar amounts of the dianhydride monomer and a diamine monomer in a solvent such as m-cresol, N,N-dimethylacetamide (DMAc), and N-methyl pyrrolidone (NMP) that contains catalytic amount of a catalyst such as isoquinoline at a reflux temperature.

In some aspects, the polyimide can have a formula according to any one of the following, where n can be an integer (e.g., 1 to 100,000 or 10,000).

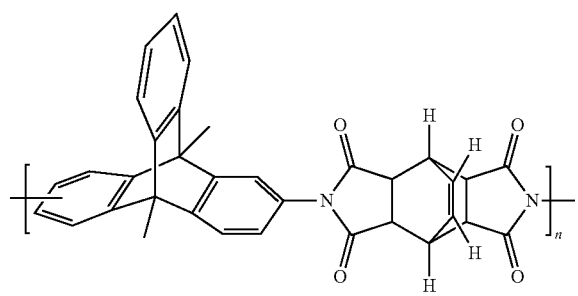

DMDAT-BCDA(H)

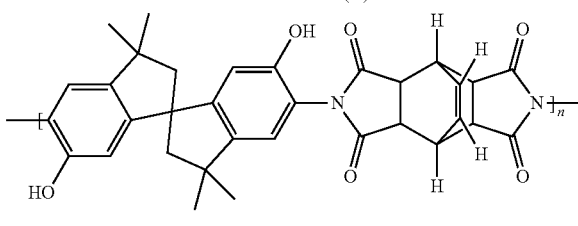

SBI-BCDA(H)

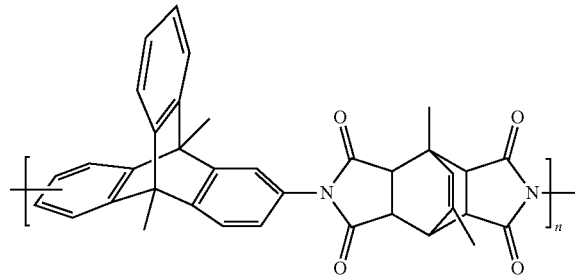

DMDAT-BCDMDA

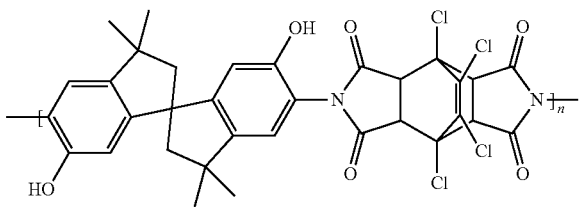

SBI-BCDA(Cl)

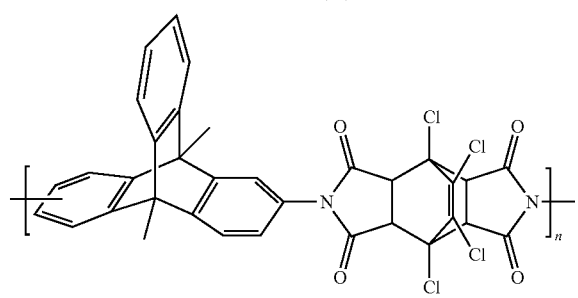

DMDAT-BCDA(Cl)

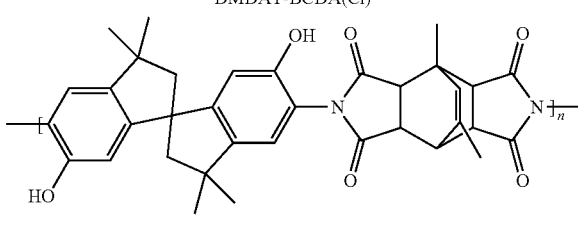

SBI-DMBCDA

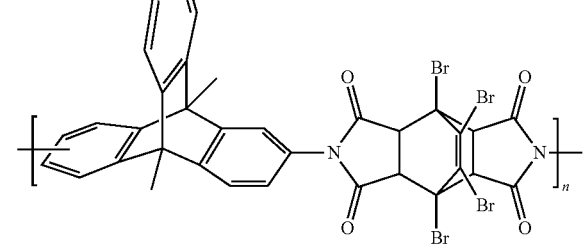

DMDAT-BCDA(Br)

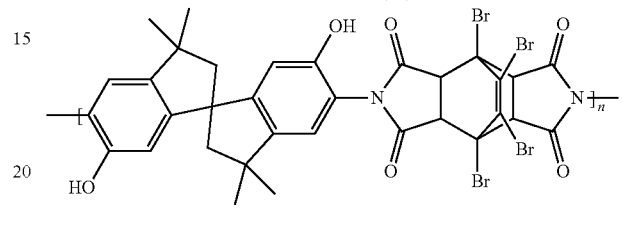

SBI-BCDA(Br)

An embodiment of the method used to prepare the dianhydride monomer has advantages of being inexpensive, utilizing commercially available starting materials, relies on simple synthetic chemistry, and can yield high purity dianhydride monomer monomers that can be used to obtain high molecular weight polyimides or polyamides.

After polymerization, the resulting polyimide solution can be added to methanol to produce a fibrous material. The fibrous material can be purified by reprecipitation from chloroform into methanol. The purified product can be dried to in a vacuum at 120° C. to remove any residual solvents.

The polyimides described herein typically exhibit good thermal stability and solubility in common organic solvents, such as chloroform, DMAC, DMF and NMP. Further, the polyimides can be cast into films. Moreover, the prepared polyimides disclosed herein can be microporous and can have high BET surface areas, as conventionally measured by the area accessible to $N_2$ molecules at 77 K. Without being bound by theory, it is believed that the microporosity and solubility of the polyimides are a result of the incorporation of the rigid three-dimensional structure of the triptycene moiety. Without being bound by theory, it is believed that the rigid three-dimensional structure of the triptycene moiety can prevent close packing of the polymer chains and decreases the interchain interactions.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Synthesis:

The general procedure for the synthesis of novel microporous polyimides is based on non-substituted and substituted alicyclic bicyclo[2.2.2]oct-7-ene-2,3,5,6-tetracarboxylic dianhydride (BCDA). The substituents on the bridgehead and alkene bond can be fine-tuned to generate polymers with enhanced rigidity, solubility and free volume. These materials can be useful in different industrial applications including gas separation membranes, aerospace industry, sensors for trace substance detection, electronic industry, high temperature adhesion and composite materials. An embodiment of the present disclosure provides for the synthesis of PIM-PIs materials from non-substituted and substituted BCDA and their potential use as gas separation membrane materials.

Scheme (1)

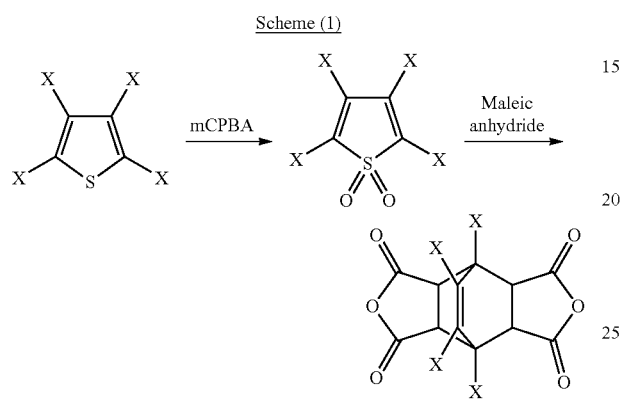

X can be H, aliphatic alkyl groups and/or aromatic or halogen substituents (e.g., Br, Cl, F). The dianhydride monomers can be synthesized via a two-step synthetic route (Scheme 1). The tetrabromo- and tetrachloro-BCDA were synthesized from tetrabromothiophene and tetrachlorothiophene, respectively. The thiophenes were first converted to the thiophene dioxides using m-chloroperbenzoic acid (mCPBA) followed by a double Diels-Alder reaction with maleic anhydride.

The 1,8-dimethyl BCDA was synthesized by refluxing isopropenyl acetate solution containing mesityl oxide, maleic anhydride, and p-toluenesulfonic acid (Scheme 2) [Wolinsky, J. and R. B. Login, *Novel route to bicyclo*[2.2.2] *octenetetracarboxylic acid dianhydrides*. The Journal of Organic Chemistry, 1972. 37(1): p. 121-125]. The molecular structures of all products were confirmed by $^1$H and $^{13}$C NMR and FTIR spectral analysis.

Scheme (2)

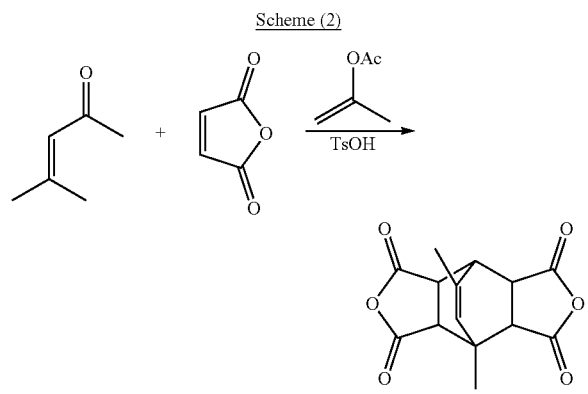

PIM-PIs can be obtained from the non-substituted and/or substituted cycloaliphatic dianhydrides by the high-temperature polycondensation reaction between equimolar amounts of tetracarboxylic dianhydride monomers and diamine monomers like 9,10-dimethyl-2,6(7)-diaminotriptycene monomer in m-cresol containing catalytic amount of isoquinoline (Scheme 3).

Scheme (3)

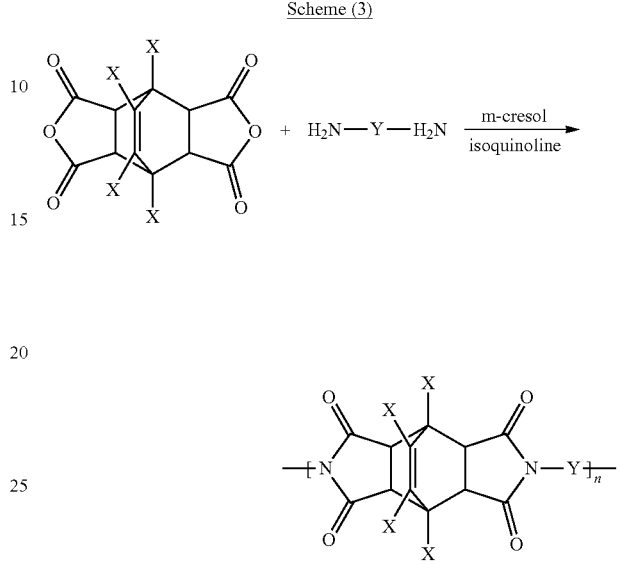

X is H, aliphatic alkyl groups, aromatic or halogen substituents (Br, Cl, F), Y is a bivalent organic group such as those described herein, and n is an integer (2 to 100,000). To illustrate the present invention, the following examples are provided.

Example 1

DMDAT-BCDA(X) (X=H, Cl and Br) polyimide synthesis: To a dry 25 ml reaction tube equipped with a Dean-Stark trap, nitrogen inlet and outlet, and reflux condenser were added 9,10-dimethyldiaminotriptycene (1.0 mmol), equimolar amount of BCDA(X) (1.0 mmol) and isoquinoline (0.1 ml). The reaction mixture was stirred at room temperature for 1 h and the temperature was raised gradually to 200° C. and kept at that temperature for 4 h under steady flow of nitrogen. The fibrous polyimide was obtained by the dropwise addition of the polymer solution to an excess of methanol (300 ml). The resulting solid was filtered and dried in an oven at 120° C. Purification was achieved by re-precipitation from DMAc into methanol and dried at 120° C. in a vacuum oven for 24 h to give 90% yield of DMDAT-BCDA(X) polyimide. The BET surface areas of DMDAT-BCDAH (with $N_2$), DMDAT-BCDACl (with $N_2$) and DMDAT-BCDABr (with $CO_2$) were 571, 338, and 189 $m^2/g$, respectively.

Polymer films were obtained by slow evaporation of a filtered, 3-5% DMAc solution at 60° C. cast on a leveled glass plate. The dry membrane was soaked in methanol for 24 hours, air-dried, and then heated at 120° C. for 24 hours under high vacuum to remove and traces of residual solvent. The film thickness of the films were determined with a precision micrometer: DMDAT-BCDA (H)—51 micrometer, DMDAT-BCDA (Cl)—48 micrometer, and DMDAT-BCDA (Br)—40 micrometer.

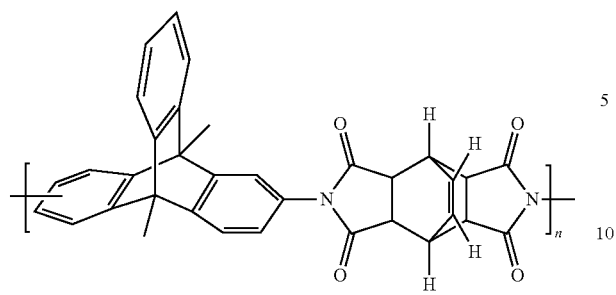

DMDAT-BCDA(H)

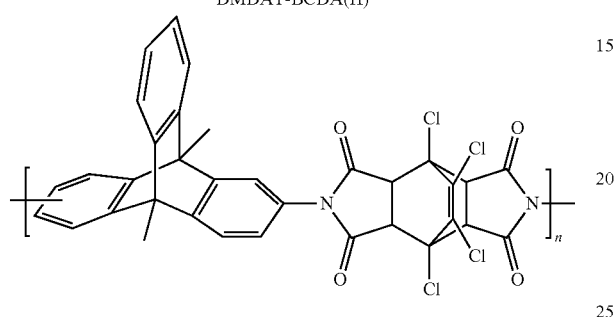

DMDAT-BCDA(Cl)

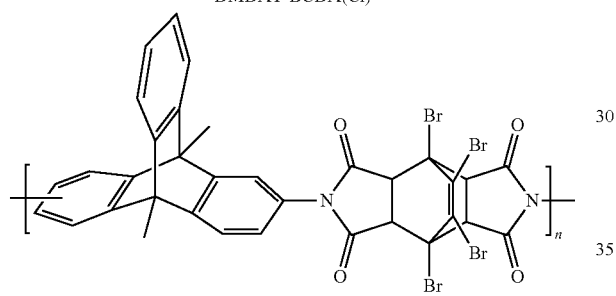

DMDAT-BCDA(Br)

Gas permeation experiments were performed with the variable pressure/constant volume technique at 2 bar and 35° C. The results are shown in Table 1.

TABLE 1

| Polymer | Pure-gas permeability (Barrer)* | | | | | Ideal selectivity | | |
|---|---|---|---|---|---|---|---|---|
| | He | $H_2$ | $N_2$ | $O_2$ | $CH_4$ | $CO_2$ | $CO_2/CH_4$ | $H_2/CH_4$ | $O_2/N_2$ |
| DMDAT-BCDA(H) | 256 | 503 | 13 | 66 | 11 | 279 | 25 | 46 | 5 |
| DMDAT-BCDA(Cl) | 152 | 234 | 4.9 | 27 | 4 | 122 | 31 | 59 | 5.6 |
| DMDAT-BCDA(Br) | 114 | 191 | 3.38 | 20 | 2.8 | 92 | 33 | 71 | 6 |

*1 Barrer = $10^{-10}$ $cm^3$(STP) cm $cm^{-2}$ $s^{-1}$ $cmHg^{-1}$

Example 2

DMDAT-DMBCDA polyimide synthesis: To a dry 25 ml reaction tube equipped with Dean-Stark trap, nitrogen inlet and outlet, and reflux condenser were added 9,10-dimethyldiaminotriptycene (1.0 mmol), equimolar amount of DMBCDA (1.0 mmol) and isoquinoline (0.1 ml). The reaction mixture was stirred at room temperature for 1 h and the temperature was raised gradually to 200° C. and kept at that temperature for 4 h under steady flow of nitrogen. The fibrous polyimide was obtained by the dropwise addition of the polymer solution to an excess of methanol (300 ml). The resulting solid was filtered and dried in an oven at 120° C. Purification was achieved by re-precipitation from DMAc into methanol and dried at 120° C. in a vacuum oven for 24 h to give 95% yield of DMDAT-DMBCDA polyimide. The surface area of DMDAT-DMBCDA was 350 m²/g.

Polymer films were obtained by slow evaporation of a filtered, 3-5% DMAc solution at 60° C. cast on a leveled glass plate. Dry membrane was soaked in methanol for 24 hours, air-dried, and then heated at 120° C. for 24 hours under high vacuum to remove and traces of residual solvent. Film thickness was 55 micrometer.

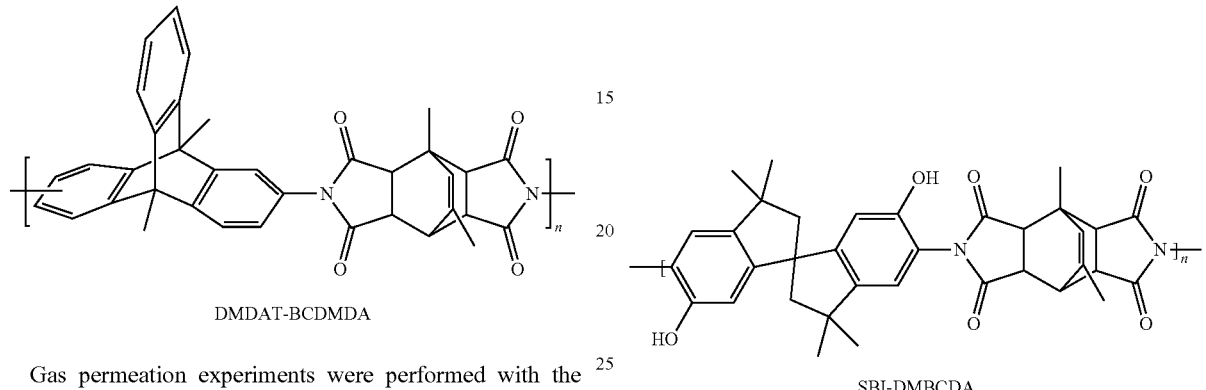

DMDAT-BCDMDA

Gas permeation experiments were performed with the variable pressure/constant volume technique at 2 bar and 35° C. The results are shown in Table 2.

TABLE 2

| Polymer | Pure-gas permeability (Barrer)* | | | | | Ideal selectivity | | |
|---|---|---|---|---|---|---|---|---|
| | He | $H_2$ | $N_2$ | $O_2$ | $CH_4$ | $CO_2$ | $CO_2/CH_4$ | $H_2/CH_4$ | $O_2/N_2$ |
| DMDAT-DMBCDA | 224 | 400 | 12 | 59 | 12 | 257 | 21 | 33 | 4.9 |

*1 Barrer = $10^{-10}$ cm³(STP) cm cm⁻² s⁻¹ cmHg⁻¹

Example 3

SBI-BDCAH and SBI-DMBCDA polyimide synthesis: to a dry 25 ml reaction tube equipped with Dean-Strak trap, nitrogen inlet and outlet, and reflux condenser were added SBI (1.0 mmol), equimolar amount of BCDA(H) or DMBCDA (1.0 mmol) and isoquinoline (0.1 ml). The reaction mixture was stirred at room temperature for 1 h and the temperature was raised gradually to 200° C. and kept at that temperature for 4 h under steady flow of nitrogen. The fibrous polyimide was obtained by the dropwise addition of the polymer solution to an excess of methanol (300 ml). The resulting solid were filtered and dried in an oven at 120° C. Purification was achieved by re-precipitation from DMAc into methanol and dried at 120° C. in vacuum oven for 24 h to give 92% yield of SBI-BCDA (H) and 89% yield of SBI-DMBCDA polyimides.

Polymer films were obtained by slow evaporation of a filtered, 3-5% DMAc solution at 60° C. from a leveled glass plate. Dry membranes were soaked in methanol for 24 hours, air-dried, and then heated at 120° C. for 24 hours under high vacuum to remove and traces of residual solvent. Film thickness were as following: SBI-BCDA (H) 34 micrometer and SBI-DMBCDA 38 micrometer.

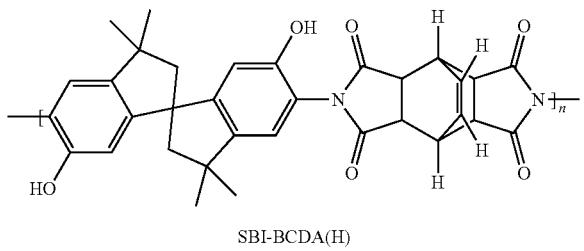

SBI-BCDA(H)

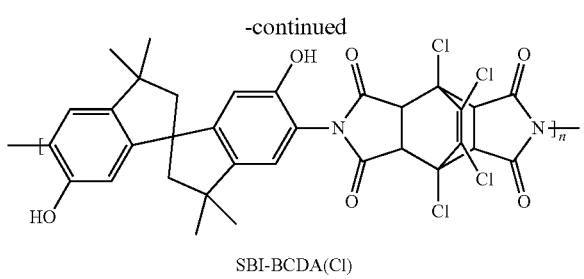

SBI-DMBCDA

-continued

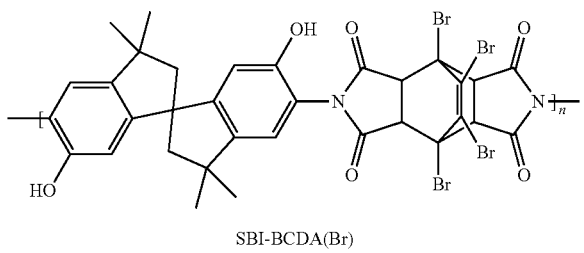

SBI-BCDA(Cl)

SBI-BCDA(Br)

Gas permeation experiments were performed with the variable pressure/constant volume technique at 2 bar and 35° C. The results are shown in Table 3.

TABLE 3

| Polymer | Pure-gas permeability (Barrer)* | | | | | | Ideal selectivity | | |
| --- | --- | --- | --- | --- | --- | --- | --- | --- | --- |
| | He | $H_2$ | $N_2$ | $O_2$ | $CH_4$ | $CO_2$ | $CO_2/CH_4$ | $H_2/CH_4$ | $O_2/N_2$ |
| SBI-BCDA(H) | 144 | 206 | 5.5 | 23 | 4.6 | 130 | 28 | 45 | 4.3 |
| SBI-DMBCDA | 213 | 319 | 7 | 38 | 6.6 | 166 | 25 | 48 | 5.5 |
| SBI-BCDA(Br) | 171 | 274 | 5.3 | 31 | 4.9 | 138 | 28 | 55 | 5.9 |

*1 Barrer = $10^{-10}$ cm$^3$(STP) cm cm$^{-2}$ s$^{-1}$ cmHg$^{-1}$

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A microporous polyimide comprising the following structure:

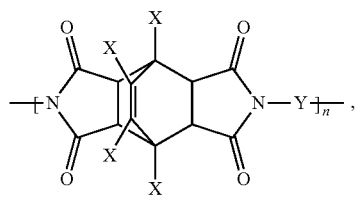

wherein n is an integer, wherein each X is independently selected from the group consisting of H, a halogen, an alkyl group, an aryl group, and a heteroaryl group, wherein Y is a bivalent organic group selected from the group consisting of:

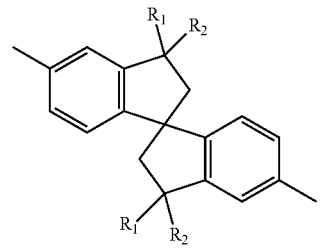

SBI

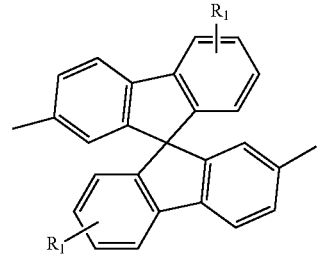

SBF

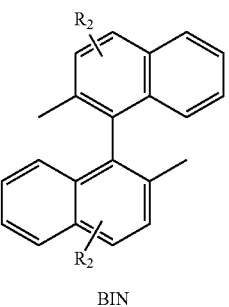

BIN

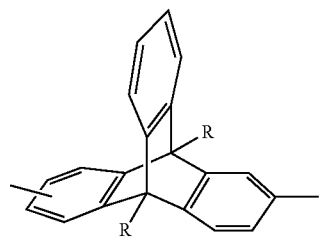

TP

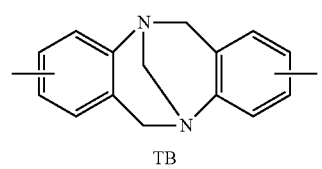

TB wherein R is an alkyl group and each $R_1$, and $R_2$ are independently selected from the group consisting of: H, a halogen, and an alkyl group, wherein when the bond is directed to the middle of a ring, this indicates that, optionally, 1 to 4 $R_1$ or $R_2$ groups are attached to the ring and each $R_1$ or $R_2$ group is independently selected.

2. The microporous polyimide of claim 1, wherein the microporous polyimide is selected from the group consisting of:

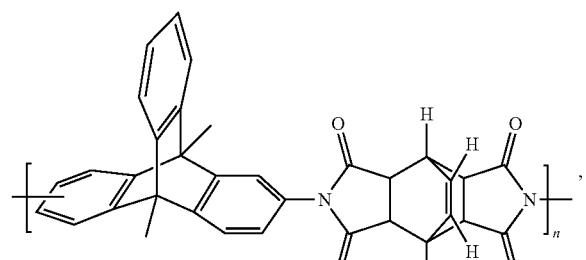

DMDAT-BCDA(H)

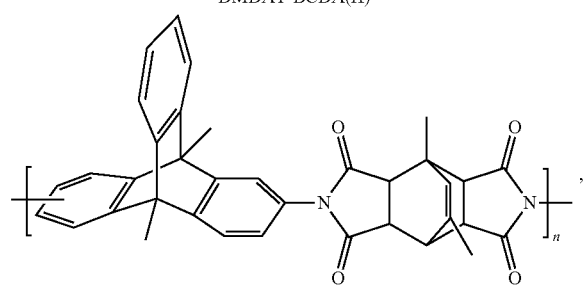

DMDAT-BCDMDA

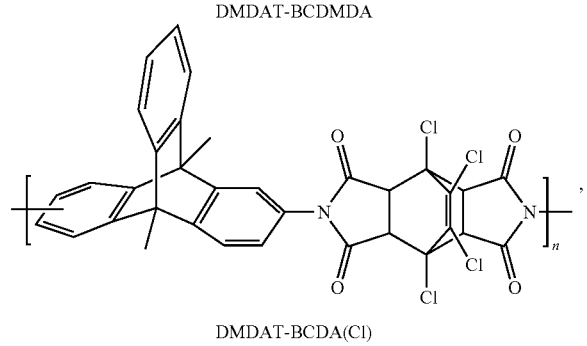

DMDAT-BCDA(Cl)

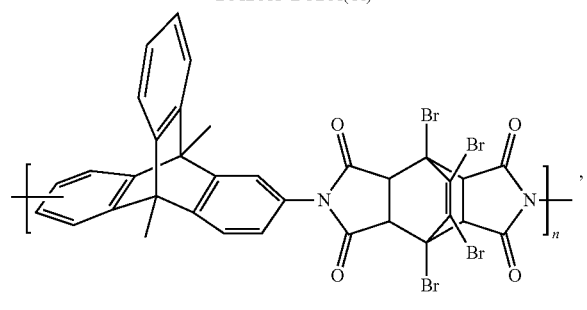

DMDAT-BCDA(Br)

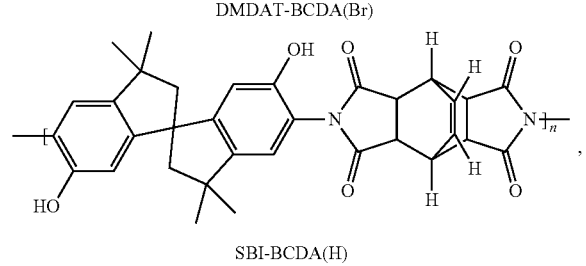

SBI-BCDA(H)

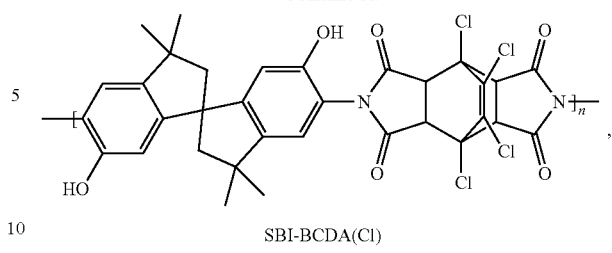

SBI-BCDA(Cl)

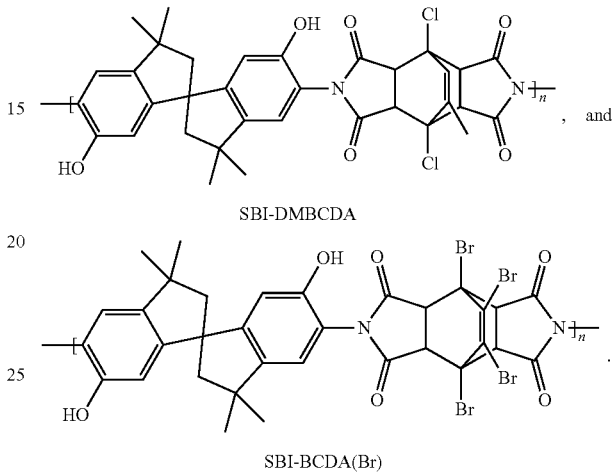

SBI-DMBCDA

SBI-BCDA(Br)

3. The microporous polyimide of claim 1, wherein the microporous polyimide has a BET surface area of at least 100 m²/g.

4. The microporous polyimide of claim 1, wherein the microporous polyimide has a BET surface area of about 100 m²/g to 1000 m²/g.

5. The microporous polyimide of claim 1, wherein Y is SBI.

6. The microporous polyimide of claim 1, wherein Y is SBF.

7. The microporous polyimide of claim 1, wherein Y is BIN.

8. The microporous polyimide of claim 1, wherein Y is TP.

9. The microporous polyimide of claim 1, wherein Y is TB.

10. The microporous polyimide of claim 1, wherein the microporous polyimide forms a membrane for performing gas separations, wherein the membrane-based gas separations include separations of gases selected from the group consisting of: $O_2/N_2$ gas separations; $H_2/N_2$ gas separations; $H_2/C_{1+}$ hydrocarbons gas separations; $He/C_{1+}$ hydrocarbons gas separations; $CO_2/C_{1+}$ hydrocarbons gas separations; $CO_2/N_2$ gas separations; and olefins/paraffins gas separations.

* * * * *